United States Patent
Newman, Jr.

(10) Patent No.: US 10,721,927 B2
(45) Date of Patent: Jul. 28, 2020

(54) DECOY ANCHOR

(71) Applicant: Timothy Darrell Newman, Jr., Sumter, SC (US)

(72) Inventor: Timothy Darrell Newman, Jr., Sumter, SC (US)

(*) Notice: Subject to any disclaimer, the term of this patent is extended or adjusted under 35 U.S.C. 154(b) by 196 days.

(21) Appl. No.: 15/730,279

(22) Filed: Oct. 11, 2017

(65) Prior Publication Data

US 2019/0104729 A1   Apr. 11, 2019

(51) Int. Cl.
*A01M 31/06* (2006.01)

(52) U.S. Cl.
CPC .................. *A01M 31/06* (2013.01)

(58) Field of Classification Search
CPC ...... A01M 31/06; B63B 21/24; B63B 21/262; B63B 21/29; B63B 21/30; B63B 21/32; B63B 21/34
USPC ................... 43/2, 3; 114/294, 301
See application file for complete search history.

(56) References Cited

U.S. PATENT DOCUMENTS

| | | | | |
|---|---|---|---|---|
| 177,492 A | * | 5/1876 | Francis | 114/301 |
| 235,845 A | * | 12/1880 | Appleton | A01M 31/06 43/3 |
| 368,427 A | * | 8/1887 | Ryan | A01M 31/06 43/3 |
| 775,580 A | * | 11/1904 | Riggs | A01M 31/06 43/3 |
| 1,194,018 A | * | 8/1916 | Hartner | G08B 3/10 43/3 |
| 1,565,474 A | * | 12/1925 | Link | A01M 31/06 43/3 |
| 1,962,188 A | * | 6/1934 | Freeman | A01M 31/06 119/792 |
| 2,023,526 A | * | 12/1935 | Hoberg | A01M 31/06 43/3 |
| 2,278,594 A | * | 4/1942 | Smith | A01M 31/06 43/3 |
| 2,289,647 A | * | 7/1942 | Grossenbach | A01M 31/06 43/3 |
| 2,520,233 A | * | 8/1950 | Buehl | A01M 31/06 43/3 |
| 2,555,815 A | * | 6/1951 | Rawlins | A01M 31/06 43/3 |
| 2,589,913 A | * | 3/1952 | Wenner | A01M 31/06 114/294 |
| 2,595,966 A | * | 5/1952 | Majors | A01M 31/06 114/300 |

(Continued)

FOREIGN PATENT DOCUMENTS

| | | | | | |
|---|---|---|---|---|---|
| CA | 2252214 A1 | * | 4/2000 | | A01M 31/06 |
| CA | 2816402 C | * | 7/2018 | | A01M 31/06 |

(Continued)

*Primary Examiner* — Darren W Ark
(74) *Attorney, Agent, or Firm* — Southeast IP Group LLC; Thomas L. Moses

(57) ABSTRACT

A decoy anchor includes an integrally formed main body member having three fingers extending therefrom, generally in the shape of a W. The main body member preferably includes a pair of holes, which are used to receive an anchor line and set the depth of the anchor, as desired. The decoy anchor is preferably formed into the shape of a duck foot, wherein the fingers include knuckles along the fingers, and a claw at the end of each finger.

2 Claims, 3 Drawing Sheets

(56) References Cited

U.S. PATENT DOCUMENTS

| | | | | |
|---|---|---|---|---|
| 2,630,093 A * | 3/1953 | Toal | A01M 31/06 114/294 |
| 2,709,866 A * | 6/1955 | Stumvoll | A01M 31/06 43/3 |
| 2,747,315 A * | 5/1956 | Clemas | A01M 31/06 43/3 |
| 2,813,363 A * | 11/1957 | Leckner | A01M 31/06 43/3 |
| 3,050,895 A * | 8/1962 | Bratland | A01M 31/06 43/3 |
| 3,055,332 A * | 9/1962 | Linsdeau | B63B 21/20 114/294 |
| 3,798,820 A * | 3/1974 | Dye | A01M 31/06 43/3 |
| 3,930,328 A * | 1/1976 | Knuth | A01M 31/06 43/3 |
| 4,656,771 A * | 4/1987 | Holmes | A01M 31/06 43/3 |
| 4,826,099 A * | 5/1989 | Johnson | A01M 31/06 242/375 |
| 5,342,229 A * | 8/1994 | Whitt | B63B 21/24 114/294 |
| 5,461,816 A * | 10/1995 | Gazalski | A01M 31/06 43/3 |
| 5,822,907 A * | 10/1998 | Lukey | A01M 31/06 43/3 |
| 5,899,014 A * | 5/1999 | Bornhoft | A01M 31/06 43/3 |
| 6,357,161 B1 * | 3/2002 | Best | A01M 31/06 43/3 |
| 6,543,176 B1 * | 4/2003 | McGhghy | A01M 31/06 43/2 |
| 8,201,515 B1 * | 6/2012 | Winter | A01M 31/06 114/294 |
| 9,185,903 B2 * | 11/2015 | Paternostro | A01M 31/06 |
| D837,338 S * | 1/2019 | Newman, Jr. | D22/125 |
| 10,226,040 B2 * | 3/2019 | Kubinec | A01M 31/06 |
| 10,555,518 B2 * | 2/2020 | Anderson | A01M 31/06 |
| 2007/0266614 A1 * | 11/2007 | Cagle | A01M 31/06 43/3 |
| 2009/0077856 A1 * | 3/2009 | Cagle | A01M 31/06 43/3 |
| 2011/0094142 A1 * | 4/2011 | Ayers | A01M 31/06 43/3 |
| 2012/0073181 A1 * | 3/2012 | Loidolt | A01M 31/06 43/3 |
| 2016/0324142 A1 * | 11/2016 | Stirling | A01M 31/06 |
| 2019/0075784 A1 * | 3/2019 | Anderson | A01M 31/06 |

FOREIGN PATENT DOCUMENTS

| | | | |
|---|---|---|---|
| FR | 2671692 B1 * | 10/1993 | A01M 31/06 |
| WO | WO-0219818 A1 * | 3/2002 | A01M 31/06 |

\* cited by examiner

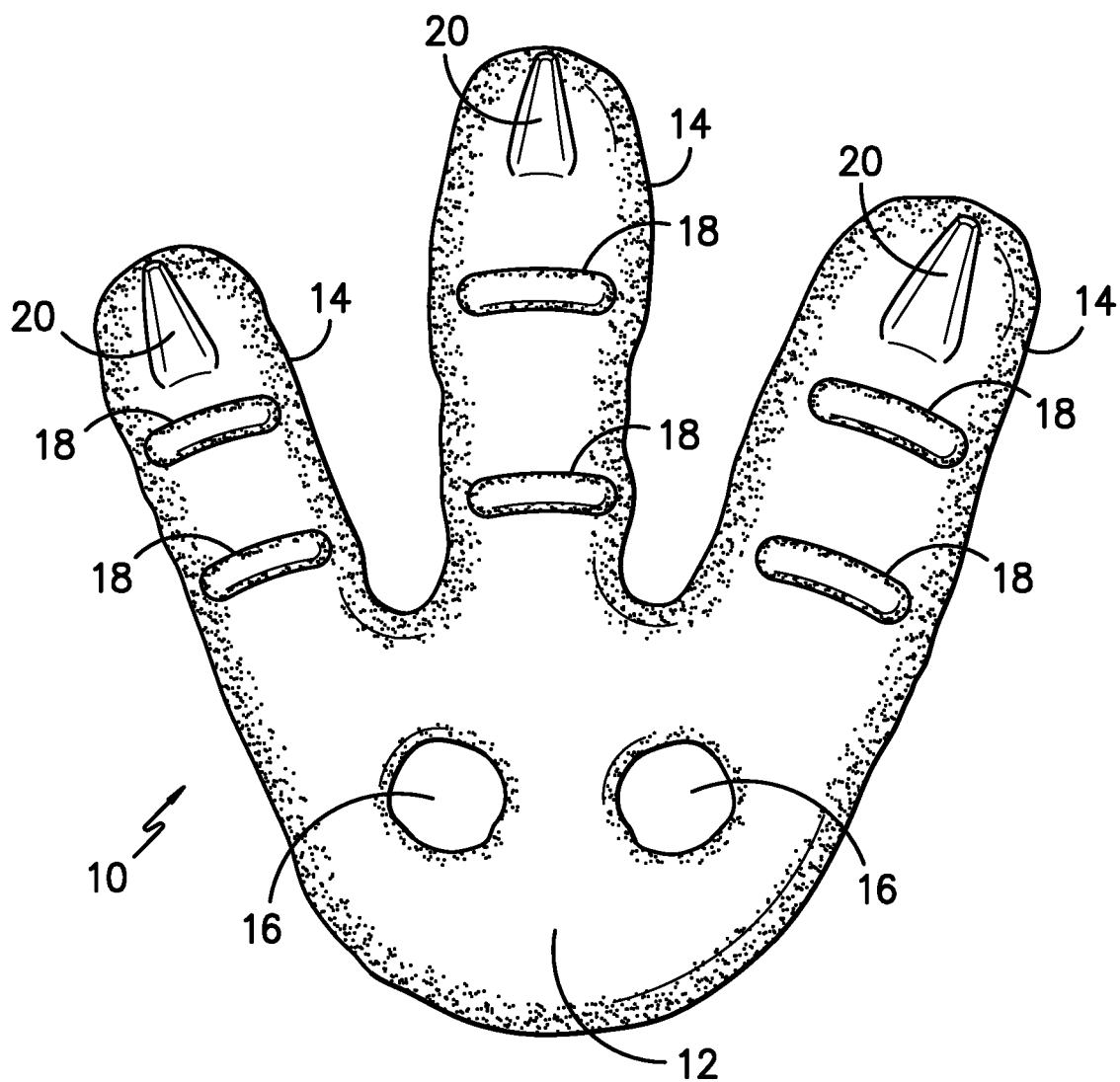
FIG. -1-

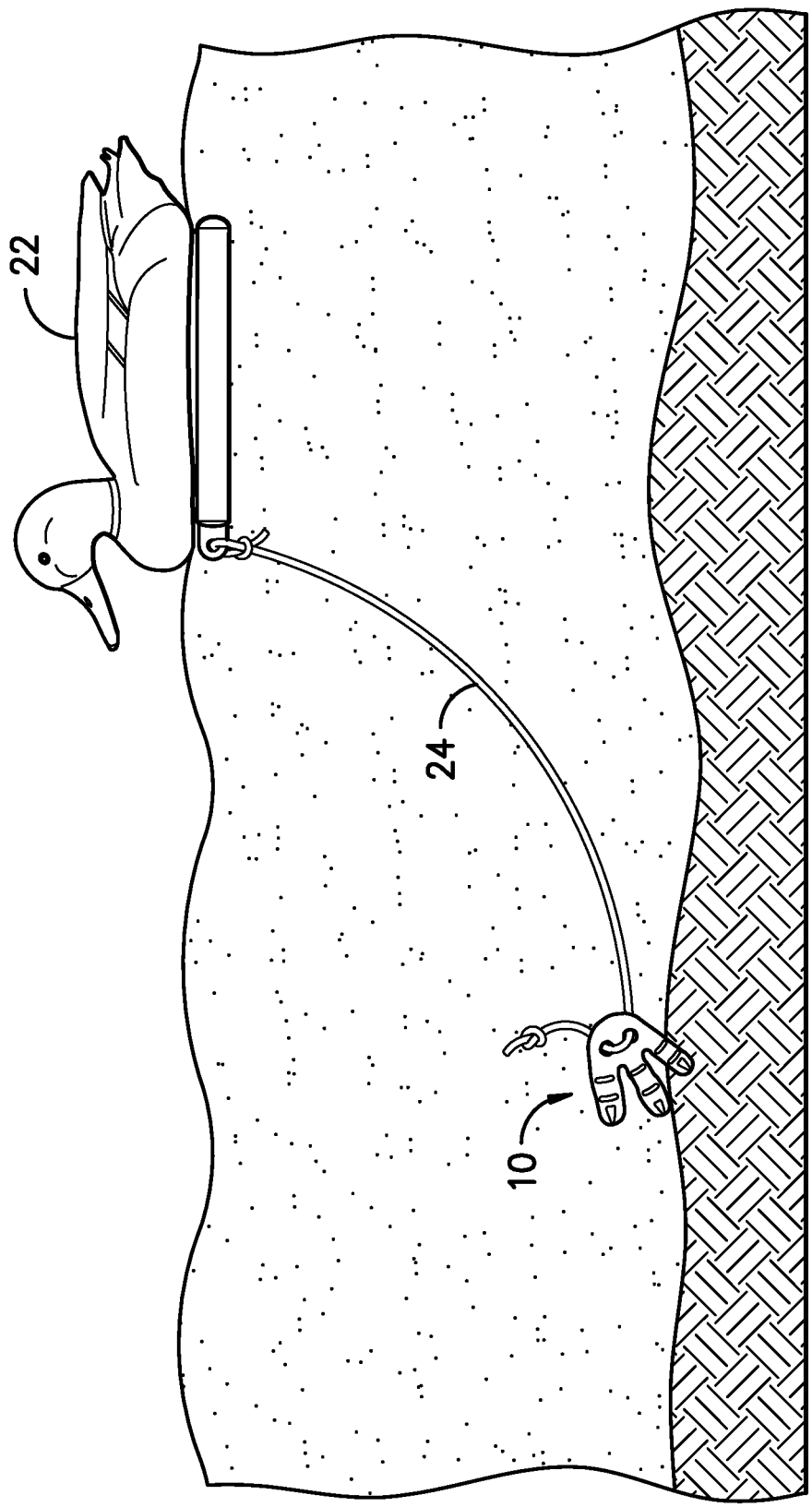
FIG. -2-

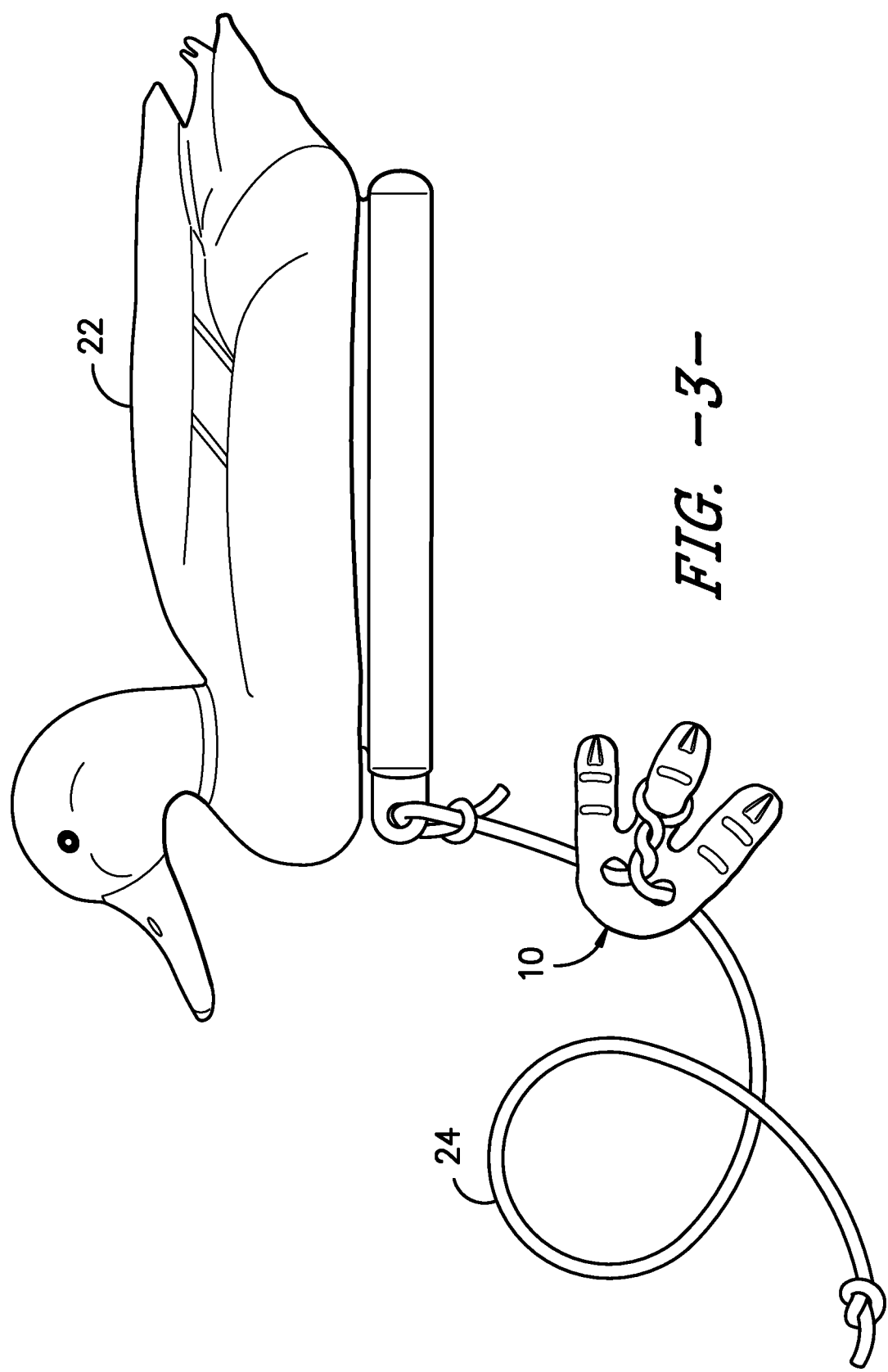
FIG. -3-

DECOY ANCHOR

BACKGROUND OF THE INVENTION

Waterfowl hunters often use floating decoys to lure their prey to a particular location while hunting. In order to keep the decoys in a generally fixed position, hunters often attach weights to an anchor line, and attach the other end of the anchor line to the underside of a decoy. The weight is dropped to the bottom of a lake or pond with the anchor line tied to it, which prevents the decoy from drifting away.

Many types of decoy anchors have been developed for this purpose. The following examples of prior efforts to develop decoy anchors illustrate the state of the art, and are incorporated herein by reference in their entireties:

U.S. Pat. No. 2,278,594—Decoy Anchor

This invention relates to an anchor designed for use in connection with decoys made of wood, rubber, fiber or any other material. Anchors are usually connected to decoys by means of lines fastened to screw-eyes on the bottoms of the decoys. When the anchors are lowered to the bottom of the body of water on which the decoys rest, they serve to prevent the decoy from drifting. Various types of anchors have been used but one of the objections found in the use of these anchors has been the difficulty in attaching to the decoy that end of the line to which the anchor is fastened. As a result, when a decoy is removed from a body of water and the line wrapped therearound accordance with the usual practice, the lines and anchors of several decoys frequently become entangled while being packed or transported.

U.S. Pat. No. 2,555,815—Anchor for Decoy Ducks

The present invention relates to new and use full improvements in anchors designed for use in connection with decoy ducks made of wood or of other suitable material.

U.S. Pat. No. 2,630,093—Portable Motion Detector and Alarm System and Method

This invention relates to a decoy anchor for use by duck hunters and the like in setting out artificial duck decoys.

U.S. Pat. No. 2,813,363—Anchor for Decoy Ducks

A conventionally shaped decoy has an elongated anchoring or tethering cord connected to the underside thereof. Said cord, in turn, is connected to one end of an elongated strap of elastic properties, and this in turn is connected to an anchor of frustoconical shape. When the decoy is not in use, the cord is coiled about the body thereof. Thereafter, the strap is coiled about the neck, and is stretched against the restraint of its inherent resiliency. Thereafter, the anchor is positioned over the bill of the decoy, and will be drawn tightly thereagainst by the tendency of the coiled strap to contract. Conventional decoy anchors tend to become entangled with one another and with their anchoring cords, when a number of decoys are deposited in a sack in accordance with conventional practice. The main object of the invention is to provide anchoring means for decoys that will eliminate these tendencies, while at the same time being efficiently usable whenever the decoys are to be floated.

U.S. Pat. No. 5,461,816—Decoy Anchor

A unitary structure which serves as a waterfowl decoy anchor having attached anchor line which structure is configured to be removably received for storage on the keel of a floatable waterfowl decoy.

U.S. Pat. No. 5,822,907—Decoy Weight

The present invention relates to a decoy weight assembly consisting of a weight having a hole through its longitudinal axis through which an elasticized cord is inserted. The end of the cord at the bottom end of the weight is attached to a hook means. The other end of the cord is connected via a string or other suitable means to the bottom of the decoy. When in use the weight slides down the cord and rests on top of the hook means. The length of cord and size of the weight will vary depending on the size and type of decoys being used. When the decoy is being transported the string and cord are wound around a stabilizing fin provided on the bottom of the decoy and retained in place by the hook means. This invention prevents the tangling of decoy weights and rope associated with prior art systems.

U.S. Pat. No. 8,201,515—Anchor for Marker Buoy, Waterfowl Decoy and the Like

An improved anchor for securing the floatation units of marker buoys, waterfowl decoys, and the like at selected locations on a body of water. The anchor has an anchor weight portion of non-lead material and a pair of clamping arms extending outwardly from the anchor body, and configured and adapted to springably spread apart to open, to close about, and to releasably clamp onto the floatation unit, thus preventing the release and tangling of anchor line. This provides convenient storage for the marker buoy or the waterfowl decoy with its wound anchor line and the attached anchor. Currently, marker buoy anchors and waterfowl decoy anchors frequently consist of a thin lead strip capable of being bent around a portion of the floatation unit of the marker buoy or the waterfowl decoy for secure storage. For use, the lead strip can be unbent to release it from the floatation unit.

US Patent Application Publication No. 20070266614 A1—Decoy Anchor

An anchor system including a tether attached to a floating decoy at a first end and a weight mounted on the tether and freely slidable to a position substantially adjacent to the floating decoy.

Each of the above-referenced decoy anchors and systems includes disadvantages. It would be desirable to provide a decoy anchor that is inexpensive and simple to manufacture, easy to use and store, and is low-profile and compact.

BRIEF SUMMARY OF THE INVENTION

In accordance with one aspect of the invention, a first embodiment of a decoy anchor includes an integrally formed main body member having three fingers extending therefrom, generally in the shape of a W. The main body member preferably includes a pair of holes, which are used to receive an anchor line and set the depth of the anchor, as desired.

In use, the anchor line or string is run up through one hole and down through the second, and then the anchor is moved up the anchor line until the desired depth is reached. Then, a user simply grasps the line that is extended between the two holes and pulls it out by a few inches to obtain some slack, then twists that portion of the line once or twice (or more, as desired), forming a loop, and then places the loop over the middle finger. Optionally, the user can also tie a knot at the distal end of the anchor line to prevent the anchor from falling off of the anchor line. When the decoy is no longer in use, the user can simply remove the loop from the middle finger of the anchor, slide the anchor up the anchor line until the anchor is directly adjacent the decoy, and secure the anchor in that position for transport and storage, with the rest of the anchor line hanging free or neatly tied in a series of loops.

BRIEF DESCRIPTION OF THE DRAWINGS

These and other features, aspects, and advantages of the present invention will become better understood with regard to the following description, appended claims, and accompanying drawings where:

FIG. 1 is a top view of one embodiment of a decoy anchor in accordance with one aspect of the present invention;

FIG. 2 is a side view of one embodiment of a decoy anchor in use, attached to an anchor line which is attached to a duck decoy; and FIG. 3 is a side view of one embodiment of a decoy anchor in use, attached to a duck decoy anchor line in a storage and transport position.

DETAILED DESCRIPTION OF THE INVENTION

The present invention includes, in a first embodiment, a decoy anchor 10 that includes an integrally formed main body member 12 having three fingers 14 extending therefrom, so that the shape of the decoy anchor 10 is generally in the shape of a W, as shown in FIGS. 1-3. The main body member 12 includes a pair of holes 16, and in a preferred embodiment, the decoy anchor 10 resembles a duck foot, showing a pair of knuckles 18 on the fingers 14, and a claw 20 disposed at the distal end of each finger 14, as shown.

The decoy anchor 10 is preferably made from a heavy material, such as metal or stone, but it should be understood that it may be made from any suitable material. Further, while it is preferred that the decoy anchor is integrally formed (as one piece, and in the case of metal, from a mold), it is contemplated that the decoy anchor 10 could be manufactured from several pieces and assembled.

In use, a decoy 22 includes an anchor line 24 attached thereto, usually on an underside of the decoy 22, and the decoy anchor 10 is attached to the anchor line 24, as shown in FIG. 2. The distal end of the anchor line 24 is run through one hole 16 and back through the second hole 16 of the decoy anchor 10. Then, the user may tie a knot at the end of the anchor line 24 to prevent the decoy anchor from falling off of the distal end of the anchor line 24. In order to set the depth of the decoy anchor 10, the anchor 10 is slid up or down the anchor line 24, as the line slides through the holes 16, to the point of the anchor line 24 that will provide the desired depth, and then the anchor line 24 is secured there, preferably using the following method. The user grasps the anchor line 24 between the two holes 16, pulls a couple of inches of line outwardly and away through the holes 16, and then twists that portion of the line into a loop (preferably either twisting once or twice, although more twists are contemplated). Then, the user places the loop(s) over the middle finger 14 to secure the anchor 10 in the desired place along the anchor line 24, which positions the anchor 10 on the anchor line 24 at the desired depth, as shown in FIG. 3. When the decoy 22 is placed into the water, the anchor 10 drops down to the desired depth while tied to the anchor line 24, and preferably rests on the bottom of the lake, pond, or other body of water to hold the decoy 22 in a generally fixed position.

When the decoy 22 is pulled out of the water, the user may remove the anchor line loop(s) from the middle finger 14, so that the decoy anchor 10 is free to slide up and down the anchor line 24, and so that the anchor line 24 slides through the holes 16 in the decoy anchor 10. For transport and storage, the decoy anchor 10 is preferably slid up the anchor line 24 until it is directly adjacent the decoy 22, and is secured at that location in the same manner described above (or in any other suitable manner), for transport and storage, as shown in FIG. 3. The rest of the anchor line 24 simply hangs free below the decoy 22 at that point, and may be stored in any traditional manner.

It should be understood that the anchor line may be affixed to the anchor 10 in any desired manner, and that the loop(s) formed by twisting the anchor line 24 between the holes 16 may be attached to any of the fingers 14. Further, it is contemplated that more or less fingers 14 may extend from the main body member 12, although three fingers 14 are preferred for simplicity, balance, and because the anchor 10 preferably is formed to resemble a duck foot.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method for anchoring a decoy in a body of water, said method comprising the steps of:

providing an integrally formed decoy anchor having a main body member, said main body member defining two holes therein and having a first side and a second side, and, further including a plurality of fingers extending from said second side of main body member;

providing a decoy;

providing an anchor line having a first end and a second end;

attaching said first end of said anchor line to said decoy;

running said second end of said anchor line through a first hole of said two holes defined in said main body member of said decoy anchor;

running said second end of said anchor line through a second hole of said two holes defined in said main body member of said decoy anchor so that said decoy anchor may freely slide along said anchor line;

sliding said decoy anchor along said anchor line to a desired position thereon;

forming a loop with a portion of said anchor line that is positioned between said holes; and extending said loop over one of said fingers extending from said second side of said main body member of said decoy anchor, thereby removably securing said decoy anchor to said anchor line at said desired position along said anchor line.

2. The method for anchoring a decoy in a body of water set forth in claim 1, further including the step of tying a knot at said second end of said anchor line to prevent said decoy anchor from becoming detached from said anchor line.

* * * * *